Jan. 1, 1963    K. METZLER    3,071,019
ADJUSTABLE V-BELT PULLEY ASSEMBLY
Filed Aug. 17, 1959
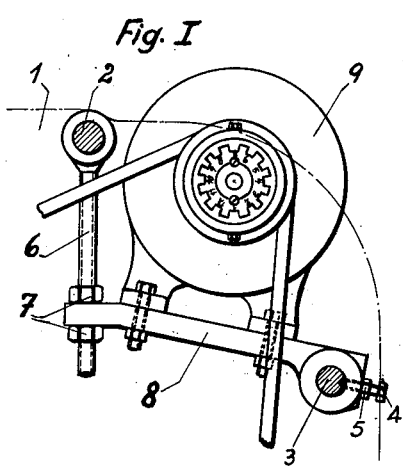
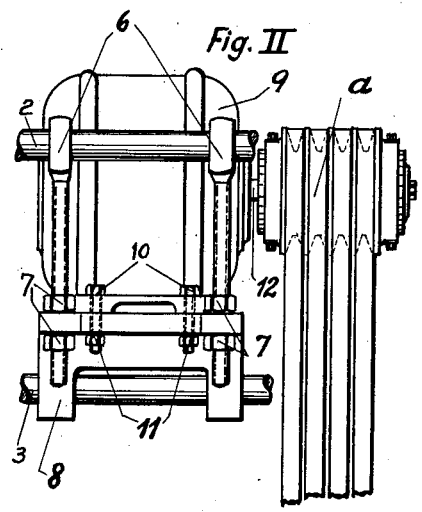
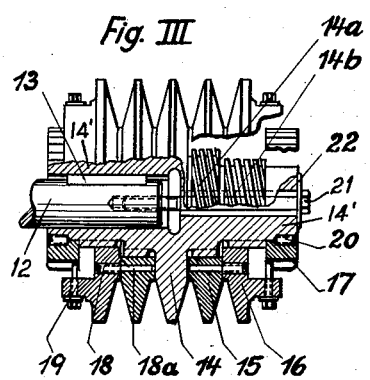
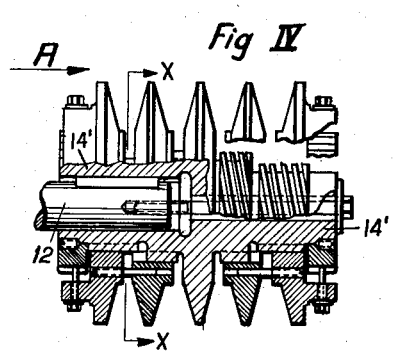
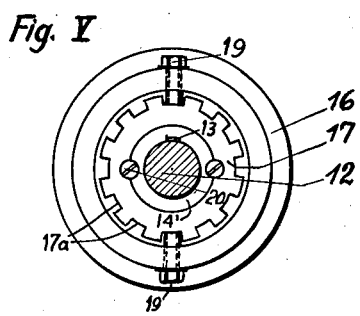
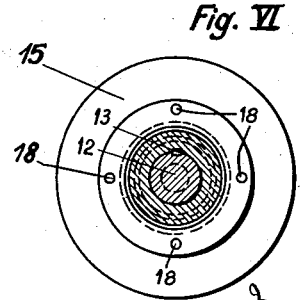
Inventor
Kurt Metzler
By Michael S. Striker
Attorney

United States Patent Office 3,071,019
Patented Jan. 1, 1963

3,071,019
ADJUSTABLE V-BELT PULLEY ASSEMBLY
Kurt Metzler, Duwockskamp 15, Hamburg-
Bergedorf, Germany
Filed Aug. 17, 1959, Ser. No. 834,014
Claims priority, application Germany Aug. 26, 1958
2 Claims. (Cl. 74—230.17)

A number of V-belt drives are known which allow a continuous variation of the speed of the driver V-belt pulley. Such known types of continuously variable V-belt drives are, however, limited as far as the power-transmisison capacity is concerned as only one V-belt can be used for power-transmission, or, if more V-belts are used, the V-belt pulley serving to regulate the number of revolutions, is very complicated in its design and therefore subject to disturbances, and further expensive in fabrication.

Variable speed V-belt drives with more V-belts are required, for example, for electro-motor drive of power looms in order to allow the adjustment of the maximum loom speed according to the type of machine and the kind of fabrics to be woven. This does not mean that the range of application of the variable V-belt drive is limited to weaving looms.

Variable speed V-belt drives in which only one V-belt is used for the power transmission are designed, on principle, in such a way that either only the driver V-belt pulley or both V-belt pulleys are made in two parts and mounted on the shafts in such a way that they can be moved in axial direction, whereby the nominal effective diameter of the pulley concerned can be varied, thus regulating the speed of the driven shaft. According to the intended use of the gear, it is possible to have one half of the pulley fixedly mounted on the shaft, whereas the other half of the pulley is movable in axial direction. Designs of this kind have been formerly patented (see German Patent No. 641,498 and British Patent No. 446,461).

Continuously variable V-belt drive pulleys for more V-belts required, in the designs hitherto known, a great number of threaded rings, locking rings, nuts fitting keys and pins, and they correspond in their operation to the regulable V-belt pulleys for one V-belt, with the exception that all plate sheaves are movable on the shaft in axial direction as described, for example, in the German Utility Model No. 1,725,141.

The present invention relates to an adjustable V-belt pulley assembly for machines, especially for weaving looms, and is characterized in that for more than two V-belts a central sheave element is mounted fast on the driver shaft and that at both sides of this sheave element and on the driver shaft or on tubular extensions or hubs of the sheave element stepped threads in any desired number are provided to mesh with additional sheave elements. The movement in axial direction of the sheave elements is brought about in simple manner and without a great number of auxiliary parts such as threaded rings, springs, nuts, etc., in that the central sheave element carries at both sides fixed hub-like extensions so that the axial position of the central sheave element remains unchanged during the displacement of the other sheave elements.

The invention will be described in greater detail with reference to the accompanying drawings, in which:

FIG. I is a front view of an electric drive motor on a loom side,

FIG. II is a side elevational view of the structure shown in FIG. I,

FIG. III is a partly elevational and partly axial sectional view of an adjustable V-belt pulley assembly mounted on the motor shaft, the assembly being shown in a position it assumes at maximum speed of the driven shaft i.e. when the V-belts are maintained at maximum distance from the axis of the motor shaft, FIG. IV shows the assembly of FIG. III in a position it assumes, at minimum speed of the driven shaft i.e. when the V-belts are maintained at minimum distance from the motor shaft axis, FIG. V is a front elevational view of the assembly as seen in the direction of the arrow A in FIG. IV, and FIG. VI is a cross section as seen in the direction of arrows from the line x—x in FIG. IV.

FIGS. I and II show, as a construction example, the tiltable arrangement of the electric motor of a weaving loom; the tiltability is necessary to hold the V-belts under tension.

The loom side 1 has two eyes for the bolts 2 and 3. The bolt 3 carries the adjustable motor base plate 8 which is held in requisite position by screws 4 and nuts 5 and which can be adjusted by means of eye bolts 6 and nuts 7 in such a manner that the required V-belt tension is guaranteed. An electric motor 9 is mounted on the motor base plate by means of bolts and nuts 11. The free end of the motor shaft 12 carries an adjustable V-belt pulley assembly $a$, fastened by a key 13 (FIG. III).

Details of the adjustable V-belt pulley assembly $a$ are shown in FIGS. III–VI.

The tubular extensions or hubs 14' of the central sheave element 14 are fitted, by means of the key 13, on the free end of the motor shaft 12. The hubs 14' can be integral with the sheave element 14 so that the sheave element 14 maintains its axial position of alignment with the middle line of the assembly $a$.

Each hub 14' is provided with a trapezoid thread 14a with larger diameter for the guidance of intermediate sheave elements 15 and with a further trapezoid thread 14b of smaller diameter but whose lead is twice the lead of the trapezoid thread 14a for the guidance of outer sheave elements 16. Slotted locking rings 17 are pressed on or otherwise fixed to the unthreaded end portions of the hubs 14' and are secured thereto by means of threaded pins 20. Four equidistant threaded bolts 18 are screwed into each outer sheave element 16, and each of these bolts has a smooth extension 18a slidably received in axially parallel holes provided in the respective intermediate sheave element 15.

The assembly $a$ may be adjusted by means of screw bolts 19 whose threaded portions are screwed into the hubs of the outer sheave elements 16 and whose ends fit into peripheral grooves or slots 17a of the locking rings 17. If necessary, the assembly $a$ can be secured against axial displacement by means of a hexagonal-head bolt 21 and washer 22.

The grooves 17a can be identified at the outer side of the respective locking ring 17 either by successive members (see FIG. I) or by the respective number of revolutions according to the single adjustment of the V-belts, or they may be marked in other ways.

The graduation of possible revolutions of the driven shaft is determined by the number of slots. For example, in the case of high-speed weaving looms, twenty-four and more slots (for twenty-four and more revolutions per minute) can be arranged, whereas for very wide weaving looms mostly about twelve slots (for twelve different speeds) will be sufficient. The regulation of the assembly $a$ is made in the following way: Supposing that the sheave elements 14—16 are in the position as shown in FIG. III, i.e. the intermediate sheave elements 15 and the outer sheave elements 16 are nearest to the central sheave element 14, then the V-belts are at the greatest distance from the axis of the shaft 12, and the driven shaft will rotate at the highest possible speed. If a reduction of the speed of the driven shaft is wanted, then the two bolt screws 19 at both ends of the assembly a must be loosened and the two outer sheave elements 16 must be turned accordingly; after having done this, the two bolt screws 19 are again tightened. FIG. IV shows the position of the sheave elements 14—16 at a minor speed of the driven shaft.

By turning relatively to the hub, according to the swivelling angle and the pitch of the trapezoid thread 14b, the two outer sheave elements 16 have moved away from the central sheave element 14. As the outer elements 16 are coupled to the respective intermediate elements 15 by means of the bolts 18, the intermediate elements 15 have turned with the outer elements 16 through the same angle and have moved away from the central sheave element 14, but as the pitch of the trapezoid threads 14a is only half of the pitch of the threads 14b, the intermediate elements 15 have moved away from the central element 14 through half the distance covered by the outer elements 16.

Hence it results that the center distances of all sheave elements have increased by the same amount so that the working radii of all V-belts have remained equal, but the diameter of the motor V-belt pulley, efficient for the V-belts, has become smaller, so that there is a reduction in speed of the driven shaft.

The FIGURES give an example of a variable speed V-belt pulley for four V-belts, but analogously the same construction can be realized as well for any number of V-belts.

If, for example, only two V-belts are sufficient for the drive, there is the possibility either to remove both intermediate sheave elements 15 whereby the four bolts 18 may be dispensed with, or the operator removes one intermediate sheave element and one outer sheave element, making use of the remaining intermediate sheave element and of the remaining outer sheave element. In the first case, if another speed is wanted, two sheave elements must be turned; in the second case only one sheave element is to be turned. If more than four V-belts are needed, then the number of intermediate sheave elements must be increased, and these additional sheave elements must be coupled with the outer sheave elements, by means of bolt screws, in such a way that the intermediate elements will, when turning the outer elements, travel through the same angle with respect to the hub of the central sheave element. The pitches of the trapezoid threads for the guidance of the intermediate sheave elements and of the outer sheave elements must be, of course, in the ratio of 1:2:3 etc. from the inside to the outside so that the center distances of the sheave elements, when regulated, remain always constant. In other words, the pitches of the successive sets of threads increase according to the succession of whole numbers.

It will be noted that the assembly of my invention consists of only few robust parts so that it can be used also for the transmission of high powers. Further, the assembly consists exclusively of lathe tooled parts, automatically machined parts, and forged parts; hence the manufacture of these parts is simple and cheap. Finally, the adjustment of the assembly to the desired speed of the driven shaft, i.e. the loom, is done in simplest way by the loosening of some screws, turning of the outer sheave elements and retightening of the fastening screws.

What is claimed as new and desired to be secured by Letters Patent is:

1. In a variable pitch sheave assembly, in combination, a rotary first sheave element having a first side and a second side; a hub rotatable with and coaxially extending from at least one side of said sheave element, said hub formed with at least two sets of external threads and each set of threads which is more distant from said sheave element having a pitch greater than the pitch of each set of threads which is closer to said sheave element so that the pitches of the successive sets of threads increase according to the succession of whole numbers, said hub having a portion extending beyond the outermost set of threads thereon; an internally threaded outer sheave element meshing with the outermost set of threads; at least one internally threaded intermediate sheave element meshing with a set of threads between said outermost set of threads and said first sheave element; means for axially movably connecting said outer sheave element with said intermediate sheave element so that a rotational movement of said outer sheave element with respect to said hub causes an equal rotational movement of said intermediate sheave element whereby the distance between said sheave elements is changed uniformly upon rotation of said outer sheave element with respect to said hub; and means for releasably locking said outer sheave element to said hub, said locking means comprising a locking ring non-rotatably fixed to said hub portion and having a plurality of axially parallel peripheral slots, and at least one substantially radially extending member secured to the outer sheave element and receivable in a selected slot of said locking ring for releasably holding the outer sheave element against rotation with respect to said hub.

2. A combination as set forth in claim 1, wherein the peripheral slots of said locking ring are provided with markings indicating the transmission ratios corresponding to the respective angular positions of said member and of said outer sheave element with respect to said hub.

References Cited in the file of this patent

UNITED STATES PATENTS

| 2,722,842 | Firth | Nov. 8, 1955 |
| 2,855,787 | Kumro et al. | Oct. 14, 1958 |

FOREIGN PATENTS

| 519,440 | Great Britain | Mar. 27, 1940 |
| 681,123 | Great Britain | Oct. 15, 1952 |
| 144,332 | Australia | Nov. 27, 1951 |
| 1,112,581 | France | Nov. 16, 1955 |